(12) United States Patent
Kato et al.

(10) Patent No.: US 8,428,304 B2
(45) Date of Patent: Apr. 23, 2013

(54) RETRIEVING SCENES FROM MOVING IMAGE DATA

(75) Inventors: Shingo Kato, Kanagawa-ken (JP);
Naruaki Masuno, Kanagawa-ken (JP);
Yoshitaka Matsumoto, Kanagawa-ken (JP); Tetsuya Shimizu, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 999 days.

(21) Appl. No.: 12/474,835

(22) Filed: May 29, 2009

(65) Prior Publication Data
US 2009/0324014 A1 Dec. 31, 2009

(30) Foreign Application Priority Data

Jun. 30, 2008 (JP) ................................. 2008-171149
Sep. 16, 2008 (JP) ................................. 2008-236829

(51) Int. Cl.
*G06K 9/00* (2006.01)
(52) U.S. Cl.
USPC ......................................... 382/103; 382/107
(58) Field of Classification Search .................. 382/100, 382/103–104, 107, 115–118, 168, 172, 124–127, 382/260; 356/27; 345/473; 348/143, 154, 348/107.99, 208.1–208.4, 208.12, 208.99, 348/699–700
See application file for complete search history.

(56) References Cited

U.S. PATENT DOCUMENTS

| 5,764,241 | A | * | 6/1998 | Elliott et al. ................... 345/473 |
| 5,892,520 | A | | 4/1999 | Ioka et al. |
| 6,809,758 | B1 | * | 10/2004 | Jones ....................... 348/208.99 |
| 6,975,755 | B1 | * | 12/2005 | Baumberg ...................... 382/154 |
| 7,889,886 | B2 | * | 2/2011 | Matsugu et al. .............. 382/103 |
| 2002/0106135 | A1 | | 8/2002 | Iwane |
| 2007/0086624 | A1 | * | 4/2007 | Breed et al. ................... 382/104 |
| 2008/0004904 | A1 | * | 1/2008 | Tran ................................ 705/2 |

OTHER PUBLICATIONS

Motion trajectory Matching of Video Objects, William Chen, and Shih-Fu Chang, Dec. 1999, Proceeding of SPIE: Storage and Retrieval for Media Database 2000, vol. 3972, pp. 544-553.*
Chikashi Yajima et al, "Querying Video Intervals by Spatio-temporal Relationships of Moving Object Traces", IEICE Technical Report, The Institute of Electronics, Information and Communication Engineers, Jul. 12, 2001, vol. 101, No. 193, pp. 167-174 (Abstract Only).

(Continued)

*Primary Examiner* — Hadi Akhavannik
*Assistant Examiner* — Mehdi Rashidian
(74) *Attorney, Agent, or Firm* — Roy W. Truelson

(57) ABSTRACT

A computer system, method and computer program that retrieves, from at least one piece of moving image data, at least one scene that includes moving image content to be retrieved. The computer system includes a storage unit that stores a locus of a model of the moving image to be retrieved and velocity variation of the model; a first calculation unit that calculates a first vector including the locus and the velocity variation of the model; a second calculation unit that calculates a second vector regarding the moving image content to be retrieved included in the at least one piece of moving image data; a third calculation unit that calculates a degree of similarity between the first and second vectors; and a selection unit that selects, at least one scene which includes the moving image content to be retrieved, on the basis of the degree of similarity.

21 Claims, 12 Drawing Sheets

OTHER PUBLICATIONS

Zaher Aghbari et al, "Searching Videos by Their Time-Varying Features", IEICE Technical Report, The Institute of Electronics, Information and Communication Engineers, Jul. 11, 2002, vol. 102, No. 208, pp. 173-180 (Abstract Only).

Fukuda Atsushi et al., "A Novel Approach for Retrieving Soccer Scenes Using Object Motion Categorization," Journal of the Institute of Image Information and Television Engineers, ISSN 1342-6907, vol. 56, No. 10, pp. 1674-1680, 2002.

* cited by examiner

FIG. 2A
201 CREATE OR SELECT 3D MODEL
202 INPUT LOCUS OF 3D MODEL
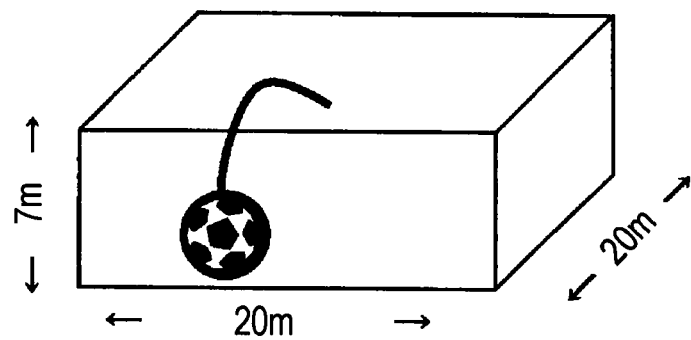
203 INPUT VELOCITY VARIATION OF 3D MODEL USING V-T GRAPH
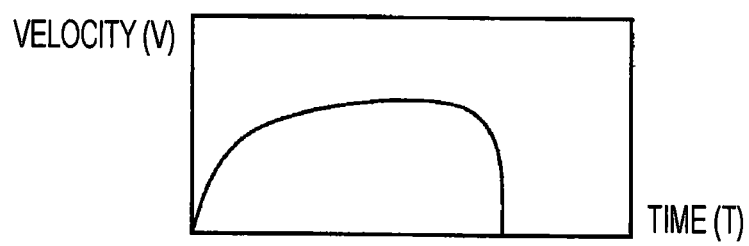
204 CORRECT DETAILS OR ORIENTATION OF 3D MODEL

FIG. 5B

|   | A1 | A2 | A3 |
|---|---|---|---|
|   | (2, 2) | (4, 3) | (6, -2) |
| B1 (4, 3) | $\sqrt{5}$ | 0 | $\sqrt{29}$ |
| B2 (6, -2) | $\sqrt{32}$ | $\sqrt{29}$ | 0 |
| B3 (8, -3) | $\sqrt{61}$ | $\sqrt{52}$ | $\sqrt{5}$ |

LOCAL ALIGNMENT
THREE-DIMENSIONAL MODEL: (2, 2), (4, 3), (6, -2)
MOVING IMAGE CONTENT: (4, 3), (6, -2), (8, -3)

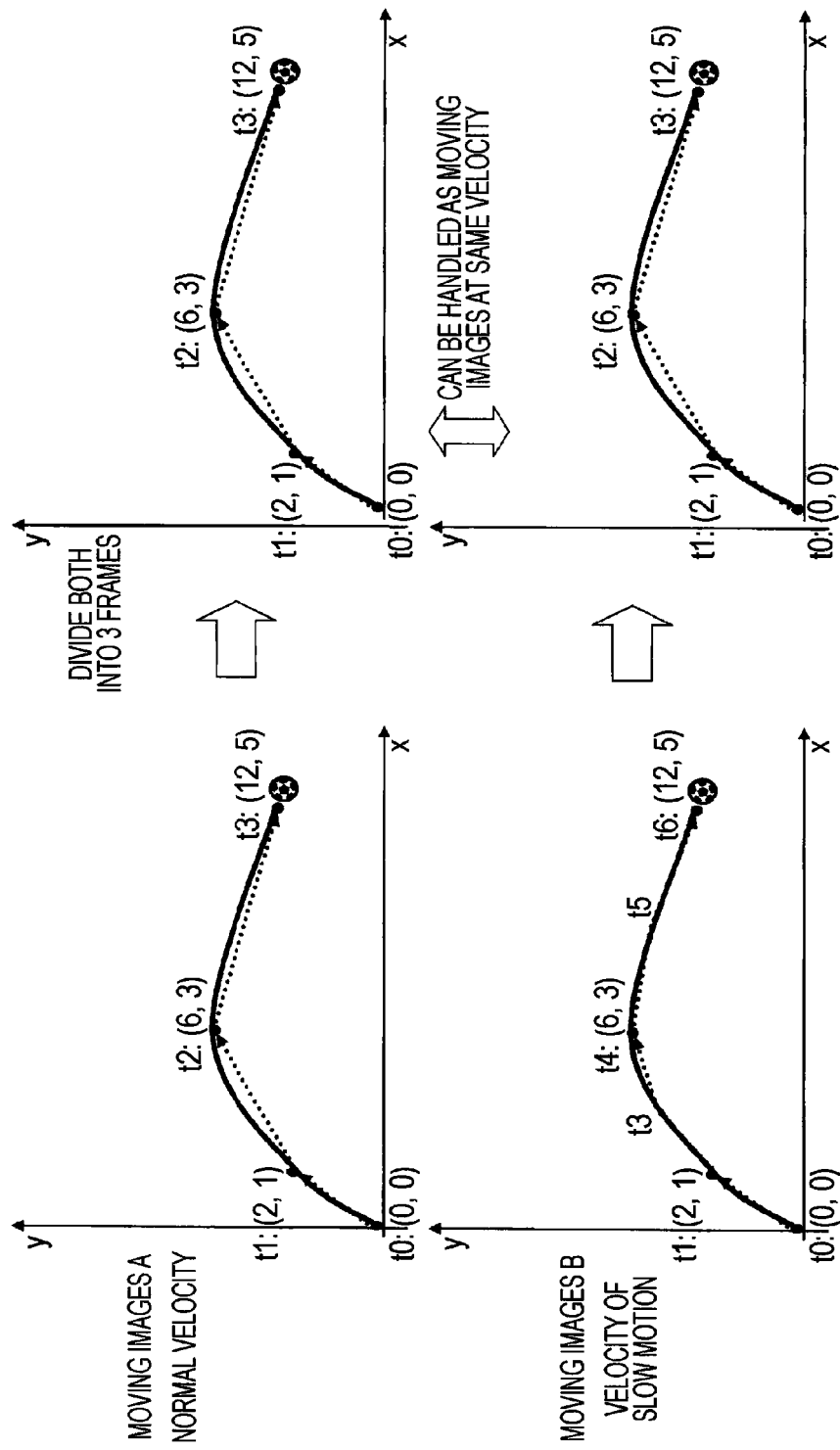

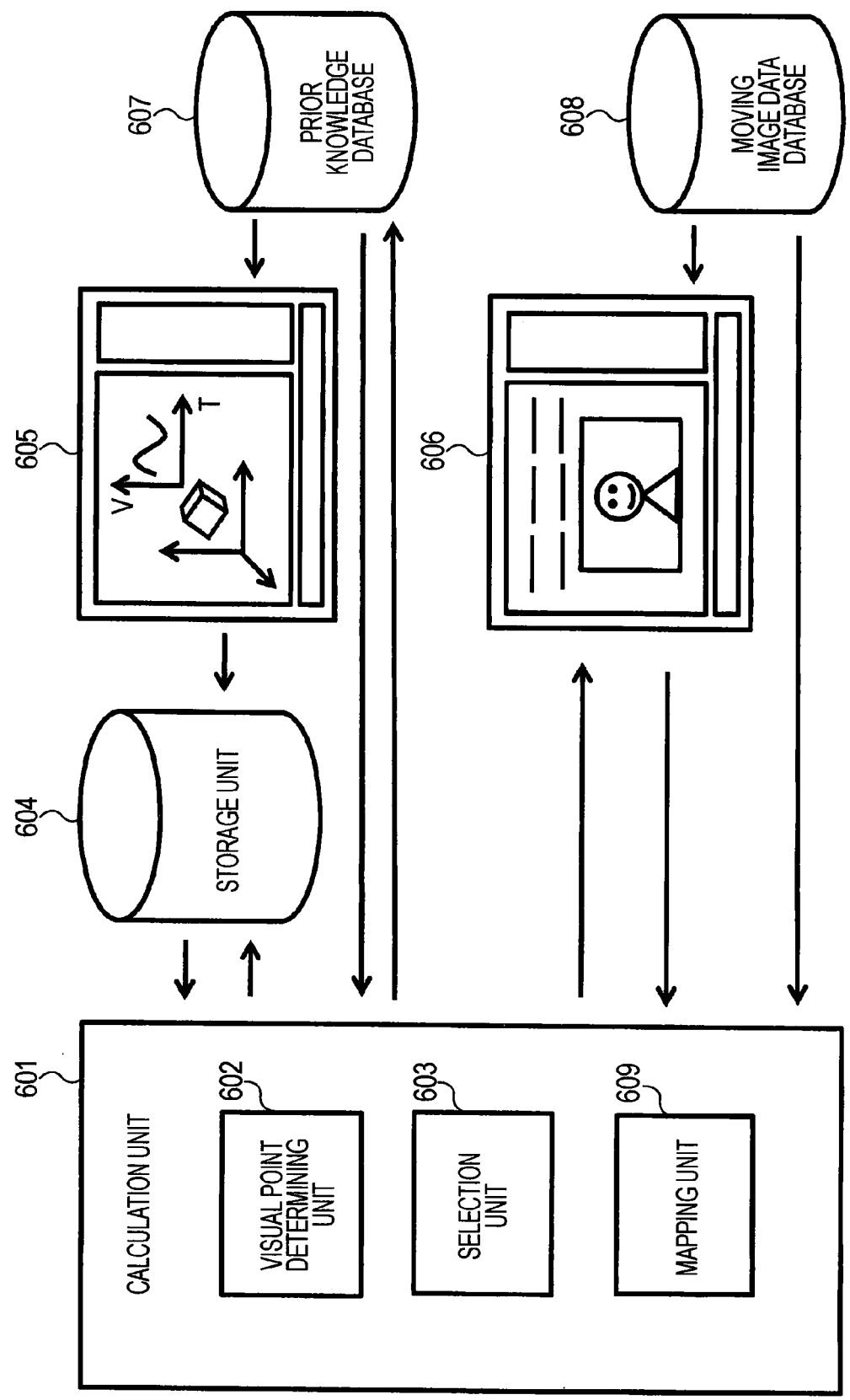

RETRIEVING SCENES FROM MOVING IMAGE DATA

FIELD OF THE INVENTION

The present invention relates to a computer system, a method, and a computer program for retrieving, from at least one piece of moving image data, at least one scene that includes moving image content to be retrieved.

BACKGROUND OF THE INVENTION

The use of moving images as media is rapidly increasing. Moreover, many pieces of moving image data are accumulated in, for example, the Internet, broadcast stations, and homes. Users desire to retrieve, from many pieces of moving image data, scenes each of which includes a specific object or a specific event.

Japanese Unexamined Patent Application Publication No. 5-108730 discloses that a user inputs a sequence of vectors that is a retrieval criterion by moving a device, for example, a mouse, that can change the position in a space, and matching is performed to retrieve a moving image that includes the scene of an input motion. However, in Japanese Unexamined Patent Application Publication No. 5-108730, it is assumed that two-dimensional motions are input.

A Japanese non-patent reference, "Fukuda Atsushi et al., A Novel Approach for Retrieving Soccer Scenes using Object Motion Categorization, Eizou Jouhou Media Gakkai Shi, Vol. 56, No. 10, pp. 1674-1680, 2002", discloses a moving image retrieval method that includes a process of categorizing motions in a soccer program. The retrieval method includes an illustrative moving image retrieval function in addition to retrieval based on text. In the illustrative moving image retrieval function, a similar scene is retrieved from illustrative scenes, and categorizing of the motions of objects in images is performed using image feature values extracted from the objects. In the process of categorizing motions, discriminant analysis that is a type of multivariate analysis is used. However, this retrieval method cannot be applied to a case where no illustrative moving image exists. Moreover, an operation to find illustrative moving images corresponds to moving image retrieval.

For example, a user may need to see moving images of a scene of a free kick of soccer from not only the front but also the back or the lateral (see FIG. 1A). In this case, the user needs to retrieve moving image data shot from the back or the lateral instead of moving image data shot from the front. In this retrieval process, a target scene needs to be retrieved from moving image data, considering the motion of an object (hereinafter called a main object) as viewed from a direction from which the user needs to view the object (for example, the motion of a ball or a player) or an event (for example, a scene of a free kick). However, in the known methods, the user cannot specify detailed retrieval criteria described above. This is because the motion of a ball or the motion of a player varies with the visual point from which a main object is viewed (see FIG. 1B). Thus, it is difficult to retrieve moving images from visual points other than a specified visual point. Accordingly, it is required to establish a retrieval method for retrieving, from many pieces of moving image data, scenes each of which includes a specific object or a specific event.

SUMMARY OF THE INVENTION

The present invention provides a computer system that retrieves, from at least one piece of moving image data, at least one scene that includes moving image content to be retrieved. The computer system includes a storage unit that stores a locus of a model of the moving image content to be retrieved and velocity variation of the model. The computer system also includes a first calculation unit that calculates a first vector regarding the model, the first vector including the locus of the model and the velocity variation of the model. The computer system further includes a second calculation unit that calculates a second vector regarding the moving image content to be retrieved included in the at least one piece of moving image data, the second vector being calculated on the basis of information on a motion of the moving image content. The computer system also includes a third calculation unit that calculates a degree of similarity between the first and second vectors by comparing the first and second vectors; and a selection unit that selects, from the at least one piece of moving image data, the at least one scene, which includes the moving image content to be retrieved, on the basis of the degree of similarity.

In an embodiment of the present invention, the model is a three-dimensional model, the locus of the model is a locus of the three-dimensional model, and the velocity variation of the model is velocity variation of the three-dimensional model. The computer system may further include a visual point determining unit that allows a user to determine a visual point in three dimensions. In one embodiment, the first calculation unit, which calculates the first vector, calculates a first vector as viewed from the visual point in three dimensions determined by the user. In another embodiment, when prior knowledge about a locus or velocity variation of the moving image content to be retrieved included in the moving image data exists, the visual point determining unit further determines visual points that are close to the prior knowledge as being candidate visual points. In yet another embodiment, the visual point determining unit further selects visual points at which velocity obtained from the first vector is large in descending order of the velocity. In an embodiment of the present invention, the third calculation unit, which calculates a degree of similarity, includes means for calculating a degree of similarity according to a weight assigned to each visual point.

In an embodiment of the present invention, the visual point determining unit further selects visual points at which acceleration obtained from the first vector is large in descending order of the acceleration. In another embodiment of the present invention, the computer system further includes a mapping unit that obtains, regarding moving images that include the moving image content to be retrieved, information on a motion of the moving image content. In another embodiment of the present invention, the third calculation unit, which calculates a degree of similarity, includes means for calculating a degree of similarity between a plurality of frames of moving images of the model and one or more frames of moving images that include the moving image content to be retrieved included in the moving image data. In another embodiment of the present invention, the third calculation unit, which calculates a degree of similarity, includes means for accommodating difference in velocity by dividing, into a constant number of frames, a plurality of frames of moving images of the model or a plurality of frames of moving images that include the moving image content to be retrieved included in the moving image data.

In an embodiment of the present invention, each piece of moving image data that includes the moving image content to be retrieved includes a tag. The computer system further includes search means for searching for tags to narrow down moving images that include the moving image content. In another embodiment of the present invention, the third calculation unit, which calculates a degree of similarity, compares the first and second vectors, compares a velocity vector obtained from the first vector and a velocity vector obtained from the second vector, and calculates a degree of similarity from the respective results of the comparison.

The present invention further provides a method for retrieving, from at least one piece of moving image data, at least one scene that includes moving image content to be retrieved. The method includes a step of storing a locus of a model of the moving image content to be retrieved and velocity variation of the model. The method further includes a step of calculating a first vector regarding the model, the first vector including the locus of the model and the velocity variation of the model. The method also includes a step of calculating a second vector regarding the moving image content to be retrieved included in the at least one piece of moving image data, the second vector being calculated on the basis of information on a motion of the moving image content. The method further includes a step of calculating a degree of similarity between the first and second vectors by comparing the first and second vectors. The method also includes a step of selecting, from the at least one piece of moving image data, the at least one scene, which includes the moving image content to be retrieved, on the basis of the degree of similarity.

In an embodiment of the present invention, the model is a three-dimensional model, the locus of the model is a locus of the three-dimensional model, and the velocity variation of the model is velocity variation of the three-dimensional model. In an embodiment of the present invention, the method includes a step of allowing a user to determine a visual point in three dimensions. In an embodiment of the present invention, the step of calculating the first vector includes a step of calculating a first vector as viewed from the visual point in three dimensions determined by the user. In an embodiment of the present invention, the step of allowing determination of a visual point includes a step of determining, when prior knowledge about a locus or velocity variation of the moving image content to be retrieved included in the moving image data exists, visual points that are close to the prior knowledge as being candidate visual points. In an embodiment of the present invention, the step of allowing determination of a visual point includes a step of selecting visual points at which velocity or acceleration obtained from the first vector is large in descending order of the velocity or the acceleration.

In an embodiment of the present invention, the method includes a step of obtaining, regarding moving images that include the moving image content to be retrieved, information on a motion of the moving image content. In an embodiment of the present invention, the step of calculating a degree of similarity includes a step of calculating a degree of similarity between a plurality of frames of moving images of the model and one or more frames of moving images that include the moving image content to be retrieved included in the moving image data. In an embodiment of the present invention, the step of calculating a degree of similarity includes a step of accommodating difference in velocity by dividing, into a constant number of frames, a plurality of frames of moving images of the model or a plurality of frames of moving images that include the moving image content to be retrieved included in the moving image data. In an embodiment of the present invention, the step of calculating a degree of similarity includes a step of calculating a degree of similarity according to a weight assigned to each visual point. In an embodiment of the present invention, each piece of moving image data that includes the moving image content to be retrieved includes a tag further including a step of searching for tags to narrow down moving images that include the moving image content to be retrieved.

The present invention further provides a second method for retrieving, from at least one piece of moving image data, at least one scene that includes moving image content to be retrieved. The method includes a step of storing a locus of a three-dimensional model of the moving image content to be retrieved and velocity variation of the three-dimensional model. The method further includes a step of allowing a user to determine a visual point in three dimensions. The method also includes a step of calculating, regarding the three-dimensional model, a first vector as viewed from the determined visual point in three dimensions, the first vector including the locus of the three-dimensional model and the velocity variation of the three-dimensional model. The method also includes a step of calculating a second vector regarding the moving image content to be retrieved included in the at least one piece of moving image data, the second vector being calculated on the basis of information on a motion of the moving image content. The method also includes a step of calculating a degree of similarity between the first and second vectors by comparing the first and second vectors. The method further includes a step of selecting, from the at least one piece of moving image data, the at least one scene, which includes the moving image content to be retrieved, on the basis of the degree of similarity.

The present invention also provides a computer program residing on tangible, computer readable media for retrieving, from at least one piece of moving image data, at least one scene that includes moving image content to be retrieved.

BRIEF DESCRIPTION OF THE DRAWINGS

FIG. 2A shows a model scene creation phase of an embodiment of the present invention.

FIG. 5B shows an example in which dynamic programming is applied to motion vectors of a three-dimensional model and motion vectors of moving image content in an embodiment of the present invention.

FIG. 5C shows an example in which the difference in velocity is accommodated in an embodiment of the present invention.

FIG. 6 shows an exemplary configuration of an overall system of an embodiment of the present invention.

DETAILED DESCRIPTION

Figure 1A:
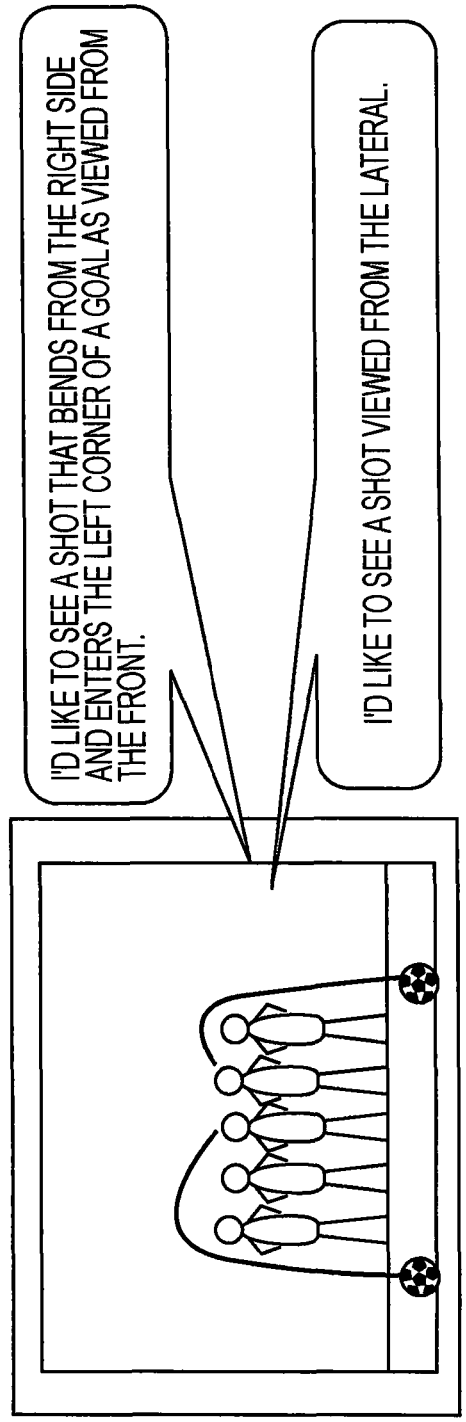
FIG. 1A shows the moving images of a scene of a free kick of soccer, the moving images being shot from the front, in an embodiment of the present invention.

In embodiments of the present invention, moving images include a sequence of a plurality of still images. A sequence of a certain number of still images that constitute some of the moving images represents a scene. Moving images include, but not exclusively, those displayed on the display units of, for example, computer systems, handheld computers, cellular phones, or televisions. Moving images displayed on the display units of, for example, computers include, for example, moving images in a virtual three-dimensional space, typified by Second Life®, and moving images distributed via networks, such as YouTube®. Examples of moving images include, but not exclusively, television images, for example, the images of sports, movies, news, dramas, and animations, and images shot at homes. Typical moving images include those owned by mass media such as broadcast stations.

In the embodiments of the present invention, moving image data represents the data of the aforementioned moving images. Moving image data can be recorded on recording media in the form of analog data or digital data. In the embodiments of the present invention, analog data is converted to digital data so as to enable retrieval of scenes that include moving image content. The method of the conversions is known to persons skilled in the art as analog-to-digital conversion. Moving image data is stored in, for example, storage media. The storage media include databases. The storage units may be connected to a computer system according to the embodiments of the present invention via cables or networks. Storage units provided in networks include network storages (NASs).

In the embodiments of the present invention, moving image content represents content to be retrieved. Objects to retrieve include, but not exclusively, tangibles, for example, balls and players.

In the embodiments of the present invention, at least one scene that includes moving image content to be retrieved represents a sequence of still images that include moving image content to be retrieved. In other words, at least one scene that includes moving image content to be retrieved represents a part of moving image data that includes moving image content to be retrieved.

In an embodiment of the present invention, each of the scenes that constitute moving images is correlated to information on the scene (hereinafter called scene information). Scene information may be stored in a database. A user can perform keyword search of moving image data using scene information. Scene information includes, for example, a position in moving images, the semantic content of a scene, the relationship between scenes, and information on the change of scene. A position in moving images includes, for example, a start frame number, an end frame number, and a time code. The semantic content of a scene includes, for example, a keyword, an attribute, and a representative frame. A keyword indicates, for example, moving image content included in moving images. The relationship between scenes is, for example, the identifier of a parent or child scene. Information on the change of scene includes, for example, the position of a change point in moving images and the type and likelihood of change.

In the embodiments of the present invention, the number of pieces of moving image content to be retrieved is at least one.

In the embodiments of the present invention, a model represents the model of the shape of an object. A model is, for example, the model of a soccer ball. A model includes a two-dimensional model and a three-dimensional model. A two-dimensional model represents the model of the shape of an object displayed in a two-dimensional space. A three-dimensional model represents the model of the shape of an object displayed in a three-dimensional space.

A model is used to identify moving image content to be retrieved in moving image data and retrieve a scene that includes the moving image content. In an embodiment of the present invention, a user can create a model using, for example, modeling software. In another embodiment of the present invention, models are prepared in a model database in advance. A user can select a desired model from the model database.

A two-dimensional model may be created using common software, for example, Adobe PhotoShop® or Illustrator®. A three-dimensional model may be created using common modeling software, for example, Shade® or LightWave3D®. In creation of a three-dimensional model, a surface is expressed as a set of polygons such as triangles or quadrangles. The shape of an object is expressed using a set of polygons. In 3DCG, another method for defining a surface is a method based on free-form surfaces. The method based on free-form surfaces is a method for constructing curved surfaces such as NURS curves, spline curves, and Bezier curves. A shape created by the method based on free-form surfaces can be smoother and more accurate than a shape modeled using only the aforementioned polygons. Moreover, for example, in Second Life®, a three-dimensional model may be created by combining prims. Prims are the basic shapes of all objects in Second Life®. Although optionally, a model may have a color, a texture, or the combination of them. A texture can be expressed by setting, for example, diffuse reflection, specular reflection, gloss, reflectivity, transmittance, the index of refraction, or the combination of them.

In the embodiments of the present invention, retrieval of at least one scene that includes moving image content to be retrieved includes a model scene creation phase and a retrieval phase.

The model scene creation phase includes creating the model of moving image content that a user needs to retrieve or selecting, from a model database, the model of moving image content that a user needs to retrieve, inputting the locus of the model, and inputting the velocity variation of the model (refer to FIG. 2A described below).

The model scene creation phase further includes determining a visual point (refer to FIGS. 3A and 3B described below). In an embodiment, a user can appropriately determine a visual point. In another embodiment, a visual point may be determined using a prior knowledge database. In yet another embodiment, a user can select a visual point from an angle at which the absolute value of a motion vector is large or a visual point from an angle at which the absolute value of a velocity vector is large.

Figure 4:
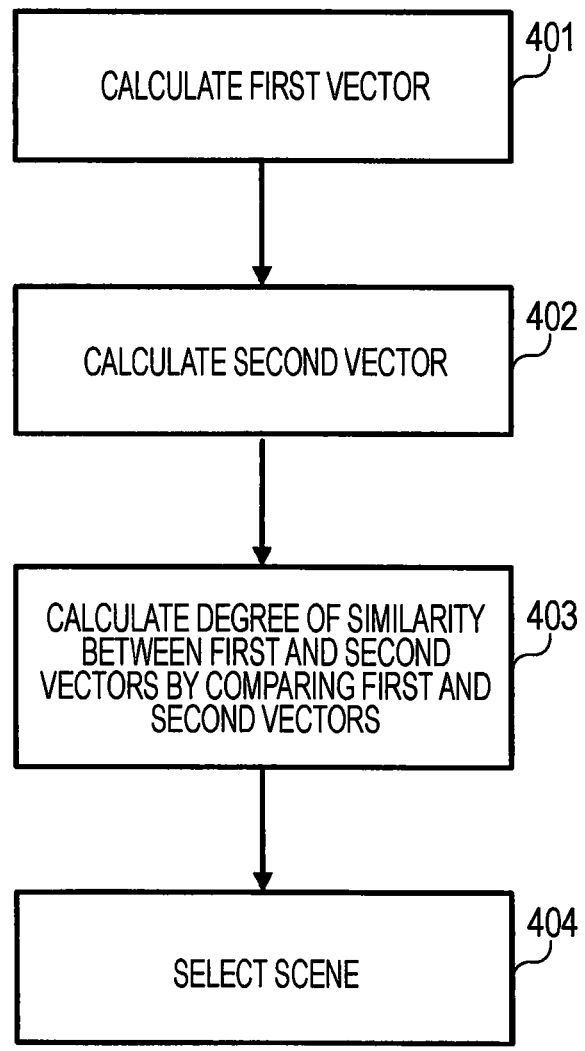
FIG. 4 shows a retrieval phase of an embodiment of the present invention.

The retrieval phase includes calculating a first vector in relation to a created or selected model, calculating a second vector in relation to moving image content to be retrieved, the moving image content being included in moving image data, calculating the degree of similarity between the first and second vectors by comparing the first and second vectors, and selecting, on the basis of the degree of similarity, at least one scene that includes moving image content to be retrieved (refer to FIG. 4 described below).

In the embodiments of the present invention, a first vector is a vector in relation to a model, especially, a three-dimensional model. A first vector includes a locus of a model and velocity variation of the model.

In the embodiments of the present invention, a locus of a model represents a locus of movement of a model (an object) as viewed from a certain visual point. In the case of two dimensions, since a visual point is fixed, the sole locus of the model is determined. On the other hand, in the case of three dimensions, since a visual point is not fixed, as a visual point from which the model is viewed changes, the locus of the model changes (refer to "LOCUS" in FIG. 2B described below). A locus of a model may be expressed as, for example, a motion vector. A motion vector is obtained from the amount of movement of an object in a space during a predetermined interval Δt (refer to FIG. 3B described below).

In the embodiments of the present invention, the velocity variation of a model represents the velocity variation of a model (an object) as viewed from a certain visual point. In the case of two dimensions, since a visual point is fixed, the sole velocity variation of the model is determined. On the other hand, in the case of three dimensions, since a visual point is not fixed, as a visual point from which the model is viewed changes, the velocity variation of the model changes. The velocity variation of a model may be expressed as, for example, a V-T graph or a velocity vector (refer to "V-T GRAPH" in FIG. 2B described below). A velocity vector is obtained from a motion vector (refer to FIG. 3B described below).

In the embodiments of the present invention, a second vector is a vector in relation to moving image content to be retrieved, the moving image content being included in moving image data. The second vector is calculated on the basis of information on the motion of moving image content to be retrieved, the moving image content being included in moving image data. Alternatively, the second vector may include the locus and velocity variation of moving image content.

In the embodiments of the present invention, a common technique may be used as a method for extracting information on the motion of predetermined moving image content (for example, a soccer ball or a soccer player) from moving image data.

In the embodiments of the present invention, information on a motion represents a motion vector or information that can be converted to a motion vector.

In the embodiments of the present invention, a locus of moving image content represents a locus of movement of moving image content (an object) as viewed from a certain visual point. In general, since moving image content is moving images shot from a certain visual point, the moving image content is two-dimensional. Thus, the sole locus of moving image content is determined in moving image data. However, when three-dimensional moving image data is recorded, a visual point is not fixed. Thus, as a visual point from which moving image content is viewed changes, the locus of the moving image content changes. The locus of moving image content may be expressed as, for example, a motion vector. A motion vector is obtained from the amount of movement of an object in a space during the predetermined interval Δt.

In the embodiments of the present invention, velocity variation of moving image content represents velocity variation of moving image content as viewed from a certain visual point. In general, since moving image data is moving images shot from a certain visual point, the moving image data is two-dimensional. Thus, the sole velocity variation of moving image content is determined. However, when three-dimensional moving image data is recorded, a visual point is not fixed. Thus, as a visual point from which moving image content is viewed changes, the velocity variation of the moving image content changes. The velocity variation of moving image content may be expressed as, for example, a velocity vector. A velocity vector is obtained from a motion vector.

In the embodiments of the present invention, the degree of similarity between the first and second vectors is calculated by comparing the first and second vectors. A common technique is used as a method for calculating the degree of similarity. For example, when it is assumed that a vector is formed of a set of points, methods for calculating the degree of similarity between two vectors include a method for calculating the Euclidean distance between two points.

The embodiments of the present invention will now be described in accordance with the drawings. The embodiments are used to describe the preferred mode of the present invention, and it should be understood that there is no intention to limit the scope of the present invention to that described here. Moreover, the same reference numerals denote the same elements throughout the following drawings, except where specifically noted.

FIG. 1A shows the moving images of a scene of a free kick of soccer, the moving images being shot from the front, in an embodiment of the present invention. Regarding the scene, for example, a user who views the moving images may need to retrieve the scene of a shot that bends from the right side and enters the left corner of a goal as viewed from the front or the scene of the shot viewed from the lateral side.

Figure 1B:
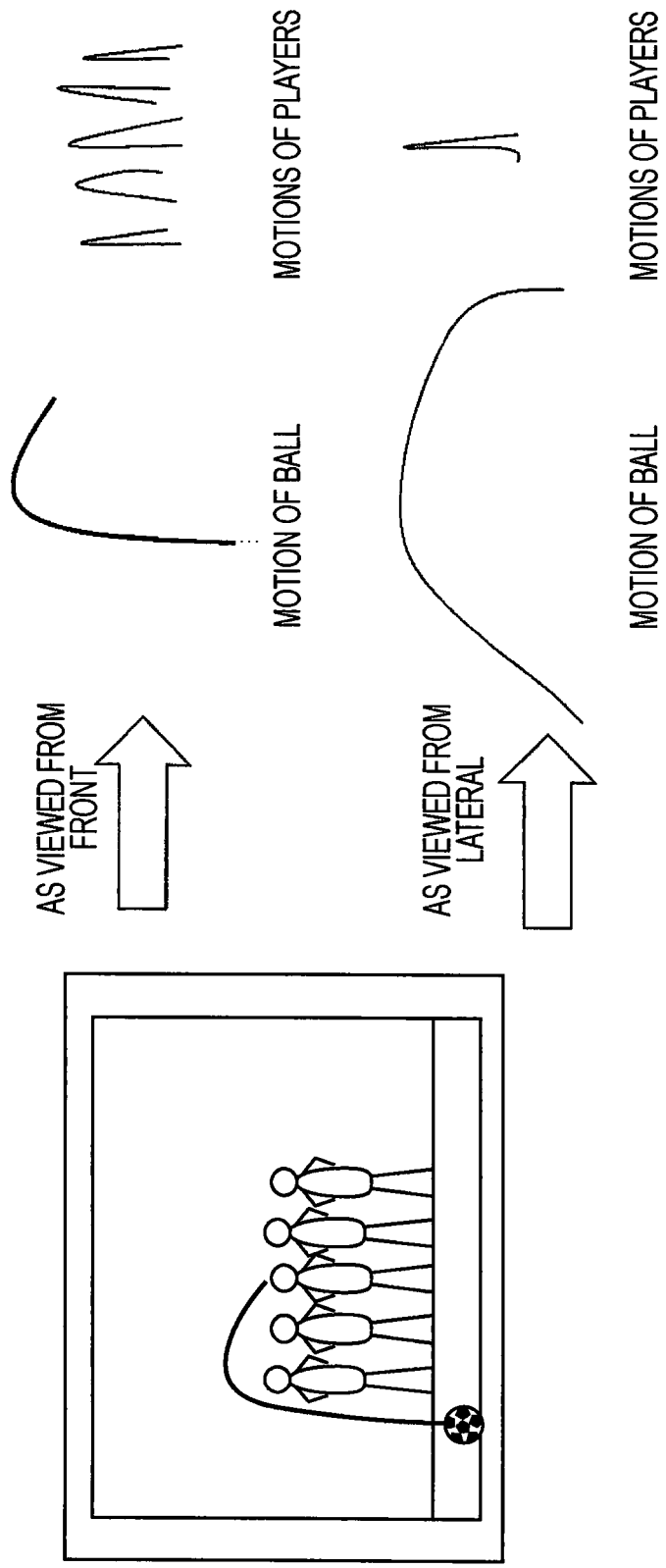
FIG. 1B shows the moving images of a scene of a free kick of soccer, the moving images being shot from the front, and the motion of a ball and the respective motions of players regarding the images of the scene, the images being shot from the back and the lateral, in an embodiment of the present invention.

FIG. 1B shows the moving images of a scene of a free kick of soccer, the moving images being shot from the front, in an embodiment of the present invention. FIG. 1B further shows the motion of a ball and the respective motions of players in relation to the moving images of the scene shot from the back side. FIG. 1B further shows the motion of the ball and the respective motions of the players in relation to the moving images of the scene shot from the lateral side.

FIG. 2A shows the model scene creation phase of an embodiment of the present invention.

Step 201

A user creates a three-dimensional model using a common technique. FIG. 2A shows a soccer ball as an exemplary three-dimensional model. Information that, for example, the soccer ball is a ball with radius R and is variegated with black and white pentagons is provided. In this case, the user may create a plurality of models. The user may create, for example, a soccer goal that is a cuboid frame other than the soccer ball. In an embodiment, the user may create a three-dimensional model using, for example, modeling software. Alternatively, three-dimensional models may be prepared in a model database in advance. The user may select a desired three-dimensional model from the model database.

Step 202

The user draws the locus of the three-dimensional model by inputting the motion of the three-dimensional model using a common technique. In the locus, the manner of movement of moving image content that the user needs to retrieve is expressed using the manner of movement of the three-dimensional model.

FIG. 2A shows the locus of the soccer ball in a three-dimensional space as the locus of a three-dimensional model. The locus is that of the center point of the soccer ball. In this case, the number of loci for each three-dimensional model is not limited to one, and, for example, respective loci may be given to a plurality of points that constitute a three-dimensional model. In an arrangement in which different loci are given to these points, a three-dimensional model can be rotated, enlarged, and reduced. In an embodiment, the user inputs the locus using a pointing device, for example, a mouse or a trackball, that can change the position in a space. The user moves the device from one position to another position to input, as the locus, the position of the start point of a desired motion, the position of the end point, the positions during the motion, and the required time. Since actual moving images that a human views are two-dimensional moving images, a two-dimensional input area for inputting the locus is set on a display. However, in this case, coordinate axes on the input area can be freely rotated by an operation from the device. Moreover, information on the locus does not include an operation and time to rotate the coordinate axes. The user draws a desired motion of the three-dimensional model on the input area by moving the device. In the embodiments of the present invention, since a motion is expressed as a sequence of vectors, the user draws a line on the input area. The computer system displays a cursor on the input area and echoes the position of the cursor back on the input area in synchronization with the movement of the device. The computer system senses the coordinates of the start point of movement of the cursor on the input area and the coordinates of the cursor during movement at predetermined intervals. As a result, the movement time and the coordinates during movement at predetermined intervals are input as the locus of the three-dimensional model.

Figure 2B:
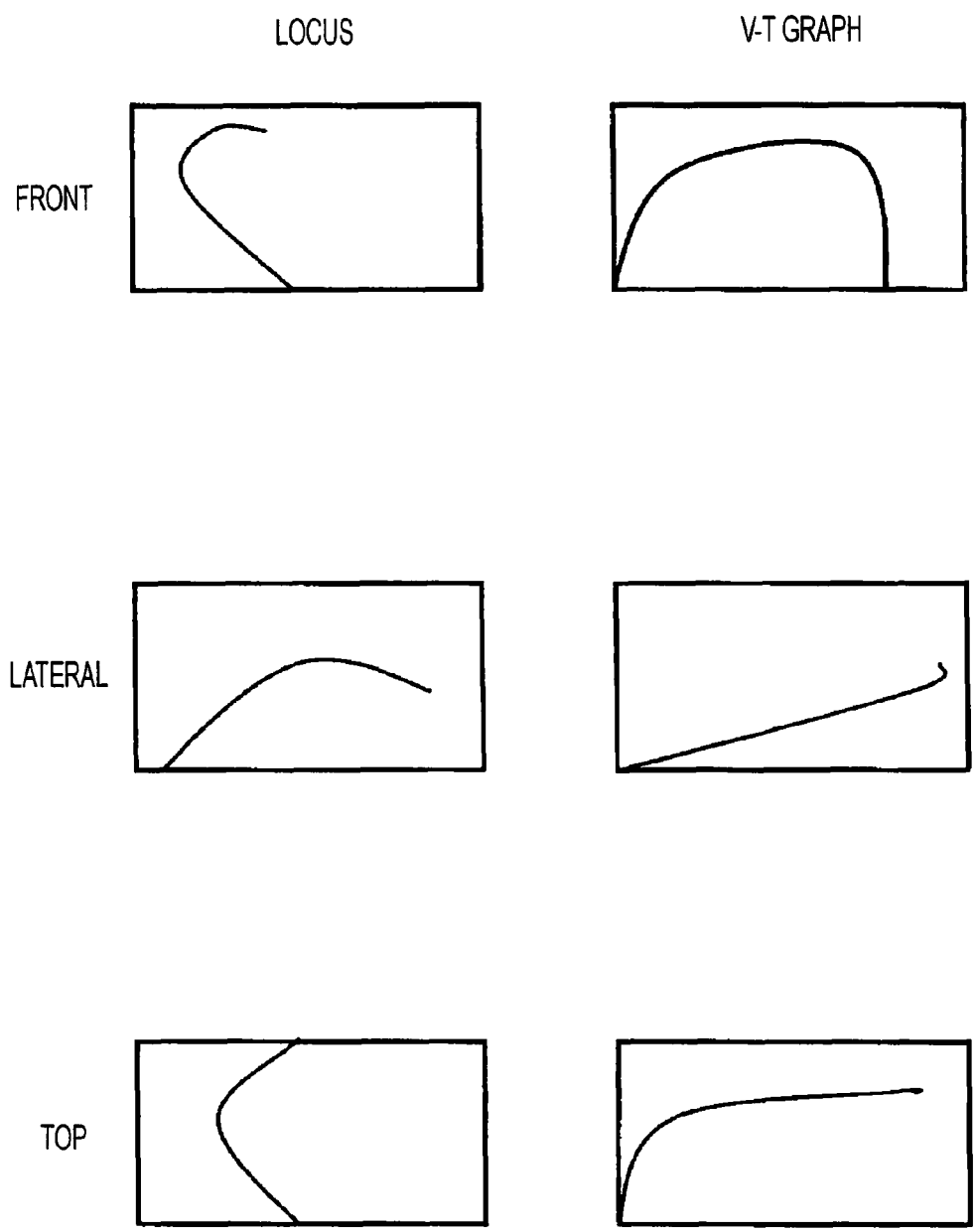
FIG. 2B shows loci and V-T graphs as viewed from the front, lateral, and top of a three-dimensional model in an embodiment of the present invention.

The drawings at the left part of FIG. 2B show the foregoing input locus of the three-dimensional model in FIG. 2A as viewed from the front, the lateral, and the top. The locus of the model varies with the visual point of the user, as shown in FIG. 2B.

Step 203

The user creates the velocity-time (V-T) graph of the three-dimensional model using a common technique. A V-T graph shows a velocity (V) on a locus at certain time (T). When a V-T graph is created, the motion of the model expressed by the locus can be retrieved, considering the acceleration. The drawings at the right part of FIG. 2B show V-T graphs as viewed from the front, the lateral, and the top. The foregoing created V-T graph of the three-dimensional model in FIG. 2A is broken down into these V-T graphs. The V-T graph varies with the visual point from which the user views the three-dimensional model, as shown in FIG. 2B.

Step 204

The user can freely correct the details or orientation of the three-dimensional model using a common technique.

Figure 3A:
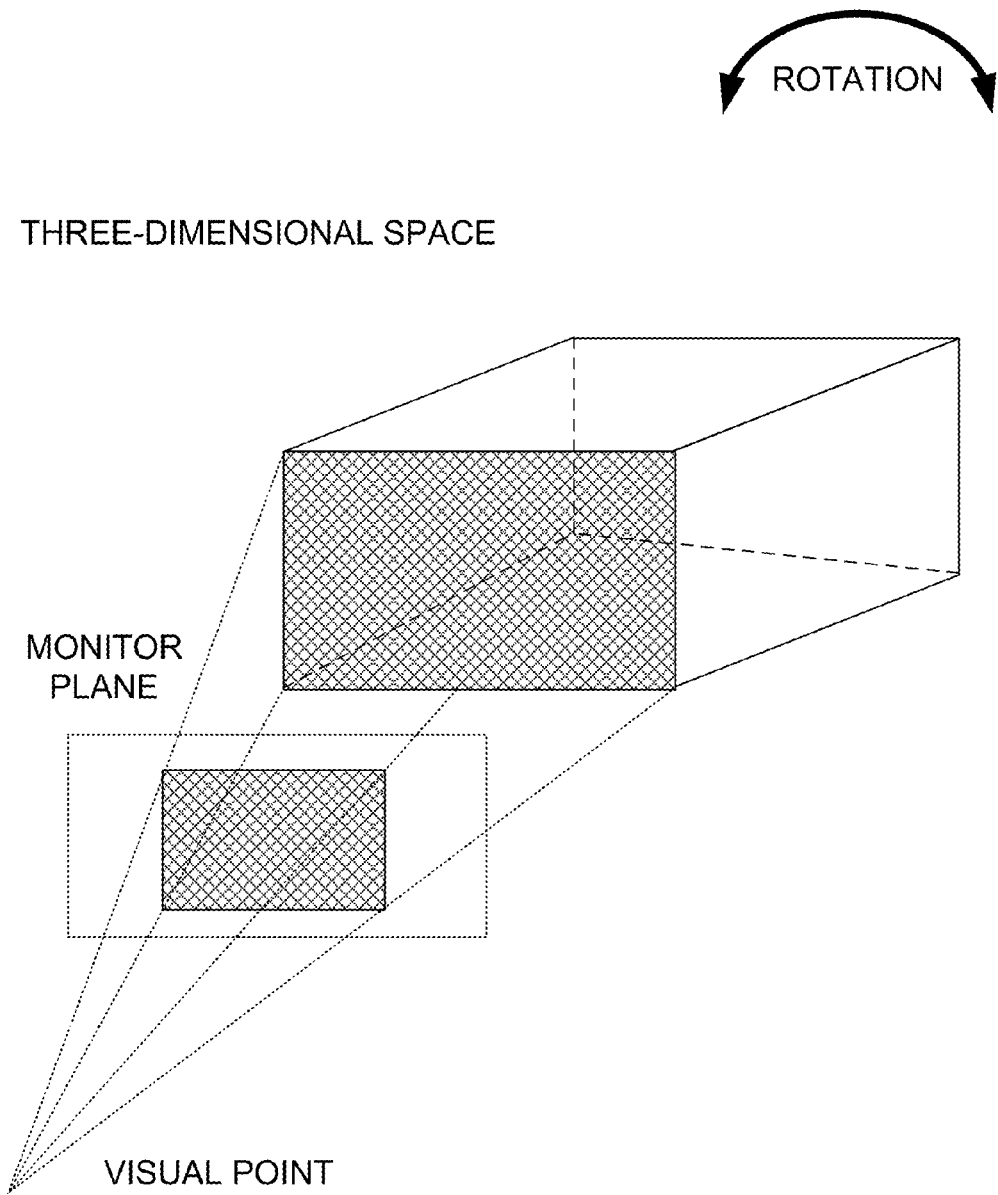
FIG. 3A shows a method for determining a visual point in an embodiment of the present invention.
Figure 3B:
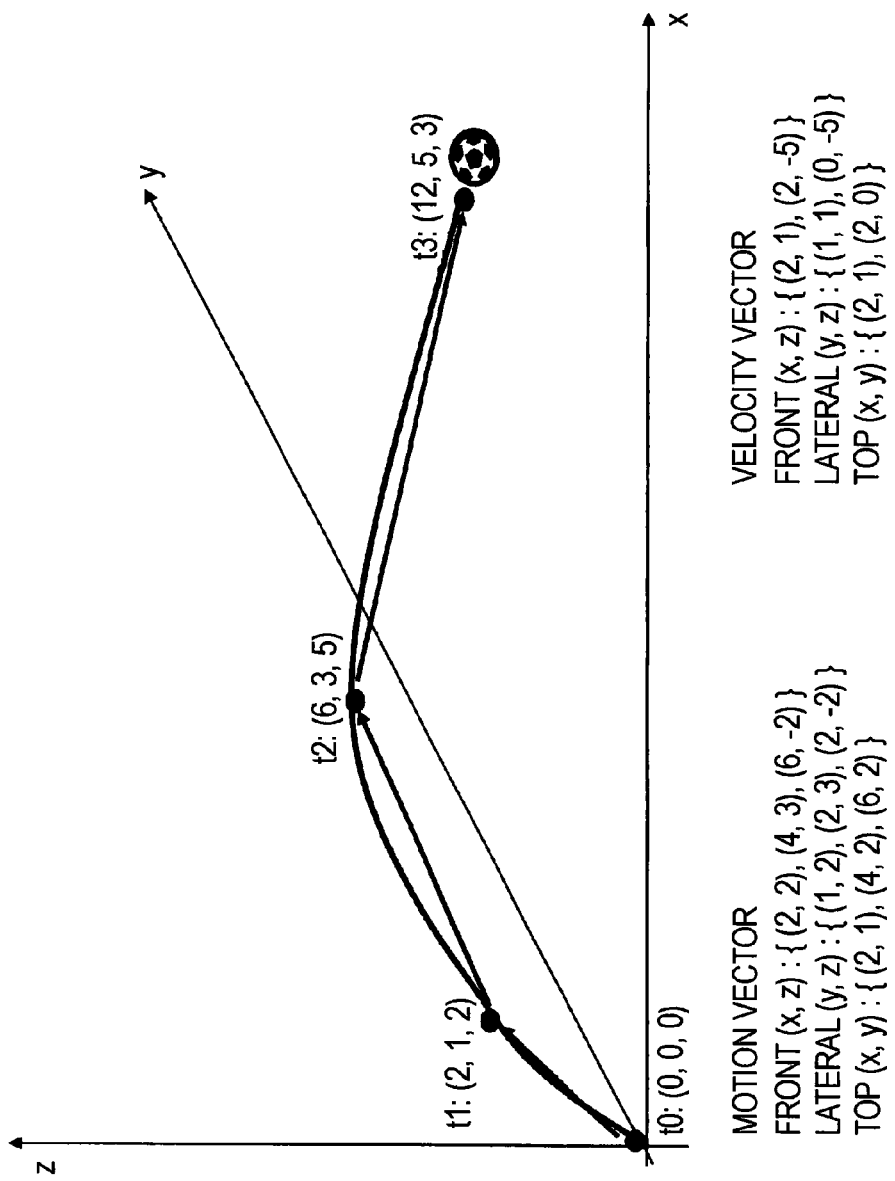
FIG. 3B shows exemplary motion vectors and exemplary velocity vectors used to determine a visual point in an embodiment of the present invention.

FIGS. 3A and 3B show a method of an embodiment of the present invention for determining a visual point.

The user can determine a visual point that can be selected in a three-dimensional space. The user can determine a visual point using the foregoing three-dimensional model and the locus and velocity variation of the three-dimensional model. In determination of a visual point, for example, moving images in which the three-dimensional model is moved along the locus can be used. For example, when the three-dimensional model is a human, a visual point can be selected in a manner that depends on which scene from which direction needs to be retrieved. Typical visual points include, but not exclusively, for example, the front, the top, the right lateral, the left lateral, the back, and the bottom in a three-dimensional space. The user can freely select all possible visual points in a three-dimensional space. In an embodiment, the user can rotate a three-dimensional space (refer to FIG. 3A) and select a visual point in a case where the motion of a three-dimensional model is viewed from a desired angle, while viewing the model displayed on a monitor (a plane).

In another embodiment, prior knowledge may be used to determine a visual point. Prior knowledge may be stored in, for example, a prior knowledge database.

In an embodiment, it is assumed that, for example, the following prior knowledge exists: in many cases, in moving images that include a scene of a free kick, a ball has motion vectors {(2,1), (4,3), (5,−2)}. The user can select, as a candidate visual point, a visual point from which the motion vectors of the ball, which is the created three-dimensional model, represent motion vectors {(2,2), (4,3), (6,−2)} that are approximately equal to the motion vectors of a ball obtained as the prior knowledge.

In an embodiment, the computer system may execute a program for determining a visual point to show the user at least one candidate visual point close to the motion vectors in the foregoing prior knowledge. The user can select, on the basis of the shown at least one visual point, a desired visual point from the at least one candidate visual point, while seeing an image of the model that is viewed from a certain visual point and displayed on, for example, a monitor.

In an embodiment, prior knowledge about various types of moving image content, for example, the sprint, may be stored in a prior knowledge database. A common technique may be used as a method for creating prior knowledge.

In another embodiment, in a case where no prior knowledge exists, a visual point may be determined by the following method. In the following method, the velocity/acceleration of a three-dimensional model is observed, and a visual point at which the motion is large is selected as a candidate visual point.

FIG. 3B shows the motion of a three-dimensional model, for example, a soccer ball, in a space. In particular, FIG. 3B shows the motion of a soccer ball in a space, considering the locus and velocity variation. The locus is expressed as a line obtained by connecting sets of coordinates of the soccer ball at time tn (t0, t1, t2, and t3) by curves. Since the moving distance changes at time intervals t: t1−t0, t2−t1, and t3−t2, it can be found that the velocity changes.

In FIG. 3B, coordinates are expressed as (x,y,z).

Respective sets of coordinates at times t0, t1, t2, and t3 are as follows: t0(0,0,0), t1(2,1,2), t2(6,3,5), and t3(12,5,3).

A. Motion vectors the respective visual points of which are front (x,z), lateral (y,z), and top (x,y) are obtained in the following manner.

(1) Respective sets of three-dimensional coordinates of the soccer ball at time t are as follows:

$(x,y,z)(t)=\{(0,0,0), (2,1,2), (6,3,5), (12,5,3)\}$.

(2) Projection is performed to transform the sets of three-dimensional coordinates into corresponding sets of two-dimensional coordinates:
front (x,y=0,z)(t):{(0,0), (2,2), (6,5), (12,3)},
lateral (x=0,y,z)(t):{(0,0), (1,2), (3,5), (5,3)}, and
top (x,y,z=0)(t):{(0,0), (2,1), (6,3), (12,5)}.

(3) Thus, the motion vectors in a case where the soccer ball is viewed from the front, the lateral, and the top are obtained in the following manner.
Since front (x,z):{(t1(x)−t0(x),t1(z)−t0(z)), (t2(x)−t1(x), t2(z)−t1(z)), (t3(x)−t2(x),t3(z)−t2(z))},
the motion vectors of front (x,z) are {(2−0,2−0), (6−2, 5−2), (12−6,3−5)}={(2,2), (4,3), (6,−2)}.
Since lateral (y,z):{(t1(y)−t0(y),t1(z)−t0(z)), (t2(y)−t1 (y),t2(z)−t1(z)), (t3(y)−t2(y),t3(z)−t2(z))},
the motion vectors of lateral (y,z) are {(1−0,2−0), (3−1, 5−2), (5−3,3−5)}={(1,2), (2,3), (2,−2)}.
Since top (x,y):{(t1(y)−t0(y),t1(x)−t0(x)), (t2(y)−t1(y), t2(x)−t1(x)), (t3(y)−t2(y),t3(x)−t2(x))},
the motion vectors of top (x,y) are {(2−0,1−0), (6−2,3− 1), (12−6,5−3)}={(2,1), (4,2), (6,2)}.

B. Motion vectors (velocity) the respective visual points of which are front (x,z), lateral (y,z), and top (x,y) are obtained in the following manner.

The motion vector (velocity) of front (x,z) is $|\{(2,2), (4,3), (6,-2)\}| \to \sqrt{(4+4)}+\sqrt{(16+9)}+\sqrt{(36+4)}=14.153$.

The motion vector (velocity) of lateral (y,z) is $|\{(1,2), (2,3), (2,-2)\}| \to \sqrt{(1+4)}+\sqrt{(4+9)}+\sqrt{(4+4)}=8.670$.

The motion vector (velocity) of top (x,y) is $|\{(2,1), (4,2), (6,2)\}| \to \sqrt{(4+1)}+\sqrt{(16+4)}+\sqrt{(36+4)}=13.033$.

C. Velocity vectors the respective visual points of which are front (x,z), lateral (y,z), and top (x,y) are obtained in the following manner.

Since front (x,z): $\{(((t2(x)-t1(x))-(t1(x)-t0(x)),((t2(z)-t1(z))-(t1(z)-t0(z)))), (((t3(x)-t2(x))-((t2(x)-t1(x)), ((t3(z)-t2(z))-(((t2(z)-t1(z)))\}$, the velocity vectors of front (x,z) are $\{(4-2,3-2), (6-4,-2-3)\}=\{(2,1), (2,-5)\}$.

Since lateral (y,z): $\{(((t2(y)-t1(y))-(t1(y)-t0(y)),((t2(z)-t1(z))-(t1(z)-t0(z)))), (((t3(x)-t2(x))-((t2(x)-t1(x)),((t3(y)-t2(y))-(((t2(y)-t1(y)))\}$, the velocity vectors of lateral (y,z) are $\{(2-1,3-2), (2-2,-2-3)\}=\{(1,1), (0,-5)\}$.

Since top (x,y): $\{(((t2(x)-t1(x))-(t1(x)-t0(x)),((t2(y)-t1(y))-(t1(y)-t0(y)))), (((t3(x)-t2(x))-((t2(x)-t1(x)),((t3(y)-t2(y))-(((t2(y)-t1(y)))\}$, the velocity vectors of top (x,y) are $\{(4-2,2-1), (6-4,2-2)\}=\{(2,1), (2,0)\}$.

D. Velocity vectors (acceleration) the respective visual points of which are front (x,z), lateral (y,z), and top (x,y) are obtained in the following manner.

The velocity vector (acceleration) of front (x,z) is $|\{(2,1), (2,-5)\}| \to \sqrt{(4+1)}+\sqrt{(4+25)}=7.621$.

The velocity vector (acceleration) of lateral (y,z) is $|\{(1,1), (0,-5)\}| \to \sqrt{(1+1)}+\sqrt{(25)}=6.414$.

The velocity vector (acceleration) of top (x,y) is $|\{(2,1), (2,0)\}| \to \sqrt{(4+1)}+\sqrt{(4)}=4.236$.

In an embodiment of determination of a visual point, the absolute value of a motion vector of a three-dimensional model is obtained by executing a program for determining a visual point. Regarding a motion vector, the velocity of a three-dimensional model is considered. Visual points from which motion vectors the absolute values of which are large are obtained are selected in descending order of the absolute values and set as candidates for a visual point (hereinafter, candidate visual points). This is because the probability that a part in which velocity variation is large is moving image content to be retrieved is high. For example, it is assumed that motion vectors for a visual point A are $\{(2,2), (4,3), (6,-2)\}$, and motion vectors for a visual point B are $\{(1,2), (2,3), (2,-2)\}$. Since the absolute value $|\{(2,2), (4,3), (6,-2)\}|$ of the motion vectors for the visual point A is larger than the absolute value $|\{(2,2), (4,3), (6,-2)\}|$ of the motion vectors for the visual point B, the visual point A is selected as a candidate visual point superior to the visual point B.

In another embodiment of determination of a visual point, the absolute value of a velocity vector of a three-dimensional model is obtained by executing a program for determining a visual point. Regarding a velocity vector, the acceleration of a three-dimensional model is considered. Visual points from which velocity vectors the absolute values of which are large are obtained are selected in descending order of the absolute values and set as candidate visual points. This is because the probability that a part in which variation of acceleration is large is moving image content to be retrieved is high.

When a plurality of candidate visual points exist, the user may preferably select any visual point while viewing a three-dimensional model.

Moreover, the user may preferably determine a desired visual point by moving and adjusting candidate visual points while viewing a three-dimensional model.

FIG. 4 shows a flowchart of the retrieval phase of an embodiment of the present invention.

The retrieval phase may be executed by a computer.

The computer system calculates a motion vector that is a first vector of a three-dimensional model (401). The first vector includes the locus and velocity variation of the model. When a plurality of candidate visual points exist, the computer system calculates first vectors as viewed from respective visual points.

The computer system calculates motion vectors that are second vectors of moving image content to be retrieved regarding a plurality of moving images (402). Second vectors are calculated using a common technique.

An exemplary method for obtaining information on a motion from moving image content will now be described. Information on a motion represents a motion vector or information that can be converted to a motion vector.

Moving image content includes a sequence of frames. The computer system divides a sequence of frames into partial moving images that are a sequence of frames that is shorter than the original sequence of frames according to predetermined rules. The predetermined rules include, for example, scene changes. The computer system generates a sequence of motion vectors by dividing a screen for the partial moving images into blocks and tracing the motion. Then, the computer system automatically generates a sequence of vectors that represents the motion of an object by integrating sequences of motion vectors that represent a similar behavior. Data generated for each representative sequence of motion vectors includes, in addition to the time series of inter-frame displacements (representative motion vectors), the number of the start frame of a motion, the number of frames in which the motion is continuous, and the coordinates of the start point of the motion in the start frame. The computer system samples the data of a representative sequence of motion vectors at intervals each of which is longer than a frame sampling interval to generate a motion index. Data generated for each motion index includes, in addition to the time series of vectors that represents a motion during the sampling interval, the start time of the motion, the duration of the motion, and the coordinates of the start point of the motion.

Another exemplary method for obtaining information on a motion from moving image content will now be described.

A method for, in moving image content to be retrieved, even when a plurality of models included in the moving image content have respective motions and the individual models are deformed due to overlapping, correctly detecting motion vectors regarding the individual models will be described.

The computer system performs area segmentation on a frame t and a frame t+1 that constitute moving image content to be retrieved and are in consecutive order. The computer system compares a selected base area with reference areas included in a retrieval range set with the base area being the center of the retrieval range. Then, the computer system generates an area by combining the base area and the reference areas in a manner that depends on the result of the comparison and segments an input image into a plurality of areas. Thus, the computer system performs area segmentation in which the frame t and the frame t+1 are segmented by classifying the areas into, for example, areas that each represent a part with a uniform pixel value and areas that each represent a part (texture) the pixel value of which periodically changes so as to generate areas that represent a plurality of models included in the frame t and the frame t+1.

The computer system examines the projection relationship regarding areas corresponding to individual models that are segmented by the area segmentation and constitute the frame t and areas corresponding to individual models that are segmented by the area segmentation and constitute the frame t+1 so as to set areas that constitute the frame t+1 corresponding to individual areas that constitute the frame t.

The computer system extracts edge Boolean masks by extracting the edges of each of the areas included in the frame t and the frame t+1. In this case, for example, the computer system extracts a feature value that represents the border between a model and a background by performing, for example, filtering in which a first derivative or a second derivative is calculated, detects the edges of a model included in each frame, and generates a binary image that includes edge parts and non-edge parts. The computer system further performs border following and thinning to extract edge Boolean masks.

The computer system performs edge matching using the edge Boolean masks regarding the frame t and the frame t+1. The computer system selects, as a matching position, a position at which a part in which the edge Boolean masks regarding the frame t and the frame t+1 overlap each other is largest.

The computer system estimates preliminary motion vectors using position vectors obtained by the edge matching.

The computer system calculates a normalized deformation ratio for each edge Boolean mask. In this case, the computer system calculates a normalized deformation ratio on the basis of the position vectors obtained from the result of the edge matching. The computer system divides, by the area of the frame t, the area of a part in which the edge Boolean masks in the frame t overlap with the frame t+1. Then, the computer system obtains a normalized deformation ratio for the edge Boolean masks across the frame t and the frame t+1 by subtracting a value obtained by the division from one.

The computer system determines a motion vector for each edge Boolean mask. The computer system specifies, as an edge Boolean mask of interest, an edge Boolean mask for which a motion vector has not been determined. The computer system forms an adjacent edge Boolean mask group by grouping edge Boolean masks that are adjacent to the edge Boolean mask of interest and for each of which a motion vector has not been determined. The computer system compares the deformation ratio of the edge Boolean mask of interest with the deformation ratio of each of the edge Boolean masks included in the adjacent edge Boolean mask group to determine whether the edge Boolean mask of interest is an edge Boolean mask with the smallest deformation ratio. When the computer system determines that the edge Boolean mask of interest is an edge Boolean mask with the smallest deformation ratio, the computer system determines a preliminary motion vector for the edge Boolean mask of interest as being a true motion vector. When the computer system determines that the edge Boolean mask of interest is not an edge Boolean mask with the smallest deformation ratio, the computer system does not determine a preliminary motion vector for the edge Boolean mask of interest as being a true motion vector.

The computer system determines motion vectors for all the edge Boolean masks by repeating a process that includes extraction of an edge Boolean mask and determination of a motion vector until all the motion vectors are determined.

Yet another exemplary method for obtaining information on a motion from moving image content will now be described.

A method for, in moving image content to be retrieved, robust estimation of the shape and motion of a model included in the moving image content using a relatively small number of frames will be described.

The computer system calculates a motion vector field in relation to a frame n−1 and a frame n that constitute moving image content to be retrieved and are in consecutive order. A motion vector field represents a set of motion vectors obtained at predetermined intervals across an entire frame. Any method, for example, the block matching method or the brightness gradient method, may be used as the algorithm for calculating a motion vector field. A vector field need not be obtained for all pixels and only needs to be obtained at appropriate intervals. For example, a vector field may be obtained for representative points at intervals of four by four pixels.

The computer system obtains motion parameters using all motion vectors that constitute a motion vector field. More specifically, the computer system obtains motion parameters by performing generalized Hough transformation of motion vectors. The generalized Hough transformation is a method for estimating parameters. In the generalized Hough transformation, votes are cast for all candidate parameters that can generate observed information, and parameters in which many votes are concentrated are determined as being estimated values. When a plurality of motions are mixed on a screen, votes are concentrated on a plurality of points in a parameter space. Thus, the plurality of motions can be estimated by sequentially searching for the plurality of points. In the embodiments of the present invention, for example, motion parameters to be retrieved may be four types of two-dimensional motions: vertical translation, horizontal translation, rotation, and enlargement.

The computer system applies motion parameters to the frame n−1, for example, performs vertical translation, horizontal translation, rotation, and enlargement. An area in which the result of the application overlaps with the frame n is an area for a corresponding motion parameter. On the other hand, an area without overlapping is an area that includes different motions.

The computer system obtains the difference between the result of the application and the frame n.

For each pixel in a frame, the computer system obtains the difference for all motion parameters and determines a motion parameter that minimizes the absolute value of the difference as being the motion of the pixel. As a result, the computer system can extract and classify models for each motion. In this case, when valid difference does not occur in a certain pixel, for example, when the texture in a model is relatively small, the classification of the pixel may not be determined and may be interpolated from the surroundings later. Moreover, the shape of a model may be adjusted by adding, for example, a noise rejection filter.

The computer system may calculate a second vector for predetermined moving images in advance and store the second vector in a database.

Moreover, the computer system may search for tags to narrow down sets of moving images that may be retrieved out of a plurality of sets of moving images. A tag is added to each set of moving images. An exemplary tag may include the genre of moving images, a keyword for, for example, moving image content, or a value correlated to a certain keyword.

When the number of candidate sets of moving images that may be retrieved is large, AND search or OR search is performed. Keywords are, for example, "free kick" and "World Cup". However, the type of search is not limited to these types of search. When the number of candidate sets of moving images that may be retrieved is small, NOT search is performed. Keywords are, for example, "tennis" and "baseball". Alternatively, sets of moving images that may be retrieved may be narrowed down by combining AND search, OR search, and NOT search.

The computer system calculates the degree of similarity between the aforementioned first and second vectors by comparing the first and second vectors. In addition to this calculation, the computer system may calculate the degree of similarity more exactly by comparing velocity vectors obtained from the first and second vectors. In calculation of the degree of similarity, the following items 1 to 3 may be considered.

For a case where the start point and/or end point of a three-dimensional model and the start point and/or end point of moving images to be retrieved differ from each other, the degree of similarity between motion vectors based on a partial match is calculated.

A case where respective sets of three-dimensional coordinates of a three-dimensional model at time t are as follows will be considered:

$$(x,y,z)(t)=\{(0,0,0), (2,1,2), (6,3,5), (12,5,3)\}.$$

For example, when motion vectors as viewed from the front are obtained, the motion vectors of the three-dimensional model are front $(x,z)$: $\{(2,2), (4,3), (6,-2)\}$.

Next, a case where the locus of moving image content of moving images is as follows will be considered:

$$(x,y=0,z)(t)=\{(2,2), (6,5), (12,3), (20,0)\}.$$

The motion vectors of the moving image content are front $(x,z)$: $\{(4,3), (6,-2), (8,-3)\}$.

The respective motion vectors of other pieces of moving image content are also obtained in advance in this manner.

For example, dynamic programming (Smith-Warterman) may be used for calculation of the degree of similarity (refer to http://www.ibm.com/developerworks/jp/java/library/j-seqalign/ for dynamic programming).

Figure 5A:
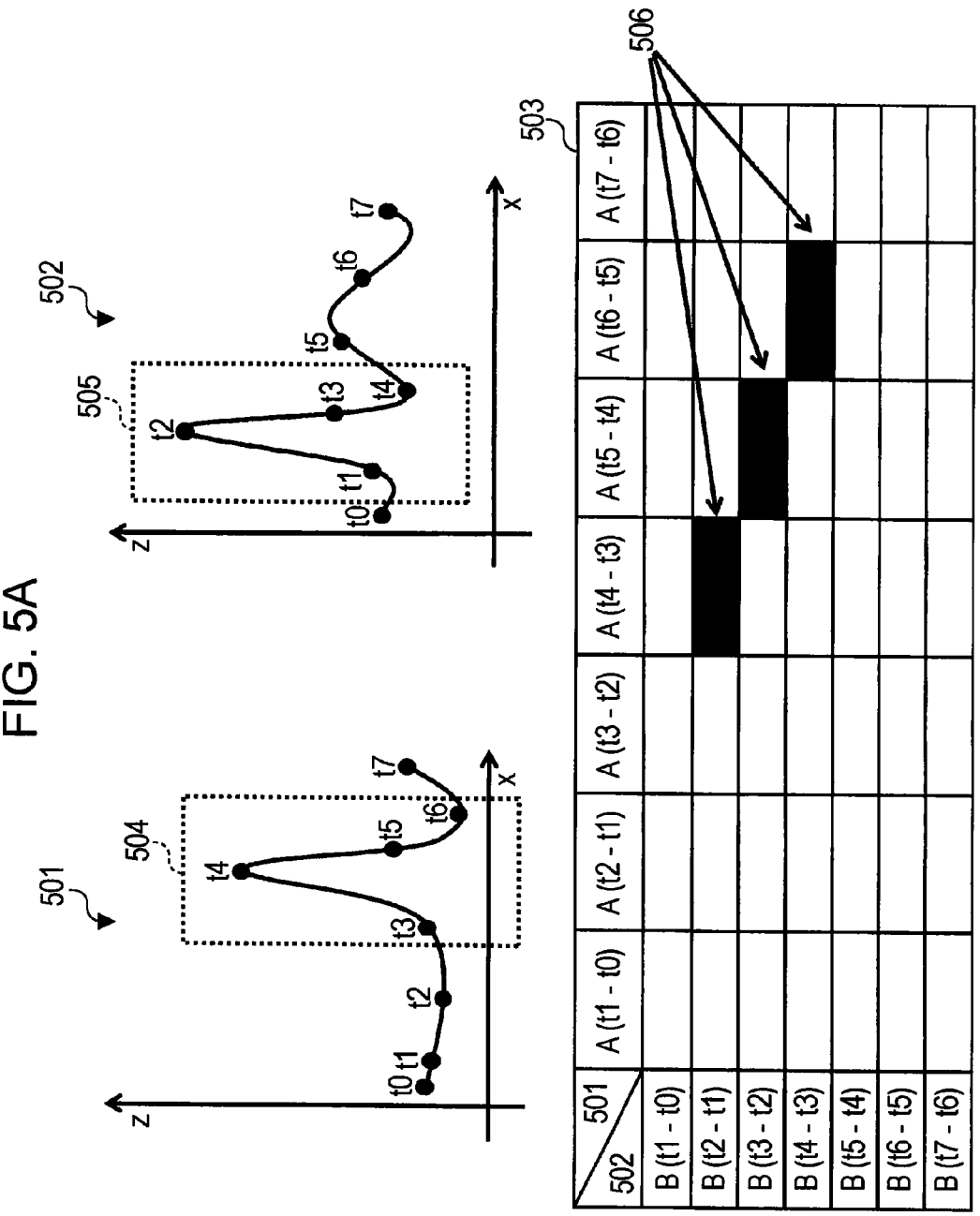
FIG. 5A shows dynamic programming of an embodiment of the present invention.

FIG. 5A shows dynamic programming of an embodiment of the present invention.

Graphs (501 and 502) shows the respective motions of models to be compared. It is assumed that the respective motions of the models are those projected onto an XZ-plane. A point on each of the graphs shows the position of a corresponding model at certain time (t0 to t7). In this case, regarding the motions of the two models, it can be said that parts surrounded by broken lines (504 and 505) are similar to each other.

A method for obtaining the parts surrounded by the broken lines (504 and 505) from a table (503) used in dynamic programming will now be described.

The horizontal axis of the table (503) shows motion vectors of the model shown in the graph (501). For example, A(t2−t1) represents a motion vector that represents the motion of the model between t1 and t2. The vertical axis of the table (503) shows motion vectors of the model shown in the graph (502). For example, B(t2−t1) represents a motion vector that represents the motion of the model between t1 and t2. The distance between corresponding motion vectors shown by the horizontal axis and the vertical axis is set in each cell in the table (503). The smaller the distance, the more similar two motion vectors can be determined to be. Moreover, when the distance is zero, two motion vectors coincide with each other. Thus, a similar part in the respective motions of the two models can be obtained by seeing the distances in the table (503). In this case, distances for the parts surrounded by the broken lines (504 and 505) are set in cells (506) that are solidly shaded in black in the table (503). In the table (503), comparison of the respective motions of the two models considering a case where the start points and/or the end points differ from each other is expressed in a shape like stairs that slope down and to the right, as shown in the cells (506). It is shown that, the closer to zero a distance set in each of the cells in a shape like stairs that slope down and to the right, the more similar the respective motions of the two models. For example, the respective motions of the parts surrounded by the broken lines (504 and 505) are similar to each other, it can be said that the respective distances set in the cells (506) are closer to zero and smaller than respective values set in other cells. A part in which motions are similar to each other can be obtained by, in this manner, searching the table (503) for a shape like stairs that slope down and to the right in which respective values in cells are close to zero.

FIG. 5B shows an example in which dynamic programming is applied to the motion vectors (front) of the aforementioned three-dimensional model and the motion vectors (front) of the aforementioned moving image content. The horizontal axis of a table shows the motion vectors (front) of the three-dimensional model. The vertical axis of the table shows the motion vectors (front) of the moving image content. A value in each cell in the table represents the distance $\sqrt{((x2-x1)^2+(z2-z1)^2)}$ between the coordinates of corresponding one of the motion vectors (front) $(x1,z1)$ of the three-dimensional model and the coordinates of corresponding one of the motion vectors (front) $(x2,z2)$ of the moving image content. A method for calculating a value in each cell is described as follows:

A1B1: $\sqrt{((4-2)^2+(3-2)^2)}=\sqrt{5}$
A2B1: $\sqrt{((4-4)^2+(3-3)^2)}=0$
A3B1: $\sqrt{((4-6)^2+(3-(-2))^2)}=\sqrt{29}$
A1B2: $\sqrt{((6-2)^2+(-2-2)^2)}=\sqrt{32}$
A2B2: $\sqrt{((6-4)^2+(-2-3)^2)}=\sqrt{29}$
A3B2: $\sqrt{((6-6)^2+(-2-(-2))^2)}=0$
A1B3: $\sqrt{((8-2)^2+(-3-2)^2)}=61$
A2B3: $\sqrt{((8-4)^2+(-3-3)^2)}=\sqrt{52}$
A3B3: $\sqrt{((8-6)^2+(-3-(-2))^2)}=\sqrt{5}$.

In the table, the value of A1B1, the value of A2B2, and the value of A3B3 represent comparison of motion vectors in the case of the same start point and the same end point and form a shape like stairs that slope down and to the right. The average of the value of A1B1, the value of A2B2, and the value of A3B3 represents the degree of similarity. Moreover, the average of respective values in cells, other than the foregoing cells, that constitute a shape like stairs that slope down and to the right represents the degree of similarity between parts.

Specifically, for example, the degree of similarity is expressed by $(\sqrt{(5)}+\sqrt{(29)}+\sqrt{(5)})\div 3$. For example, when the value of A1B2 and the value of A2B3 are used, the degree of similarity between parts is expressed by $(\sqrt{(32)}+\sqrt{(52)})\div 2$. Moreover, out of the degrees of similarity between parts, the average of the value of A2B1 and the value of A3B2 is zero, and thus a partial match occurs. Hereinafter, the degree of similarity between parts is also called the degree of similarity.

FIG. 5B shows a partial match between the motion vectors of the three-dimensional model and the motion vectors of the moving image content from moving images.

The motion vectors of the three-dimensional model are $(2,2), (4,3), (6,-2)$. The motion vectors of the moving image content are $(4,3), (6,-2), (8,-3)$.

The degree of similarity obtained by dynamic programming from data $(4,3), (6,-2)$ corresponding to the second half of the motion of the three-dimensional model, out of the motion vectors of the three-dimensional model, and data $(4,3), (6,-2)$ corresponding to the motion from the start of a scene, out of the motion vectors of the moving image content, is zero. Thus, the two sets of motion vectors partially match (local alignment) each other. Moreover, it can be said that the motions of the three-dimensional model and the moving image content partially match each other.

Next, some scenes including moving image content that makes a motion that partially matches the motion of the three-dimensional model or is similar to the motion of the three-dimensional model with the value of the degree of similarity being small are extracted in ascending order of the value of the degree of similarity, and the extracted scenes are determined as being candidates to be selected. In the following example, moving images (1 to n) represent scenes including moving image content that makes a motion that partially matches the motion of the three-dimensional model or is similar to the motion of the three-dimensional model with the value of the degree of similarity being small. A number following an equal mark indicates the degree of similarity.

| moving image | moving image number | degree of similarity |
|---|---|---|
| moving image content (front): | moving image 1 | =0 |
| moving image content (front): | moving image 2 | =3 |
| moving image content (lateral): | moving image 3 | =5 |
| moving image content (front): | moving image 4 | =6 |
| moving image content (front): | moving image 5 | =10 |
| ... | | |
| moving image content (top): | moving image n | =29 |

The computer system determines, in ascending order of the value of the degree of similarity, some scenes as being candidates to be selected, the scenes including moving image content that makes a motion that partially matches the motion of the three-dimensional model or is similar to the motion of the three-dimensional model with the value of the degree of similarity being small.

For a case where a three-dimensional model is different in velocity from moving image content to be retrieved in moving images, a part between a start point and an end point is divided into a constant number of frames to accommodate the difference in velocity.

FIG. 5C shows an example in which the difference in velocity is accommodated in an embodiment of the present invention.

Moving images A are moving images at a normal velocity, and moving images B are moving images at a velocity of a slow motion.

The moving images A and the moving images B are first divided into a constant number of frames between the start point and the end point. In this example, the moving images A and the moving images B are both divided into three frames. In two sets of moving images that are divided into a constant number of frames, since the proportion of elapsed time is the same, the two sets of moving images can be handled as moving images at the same velocity. Thus, even when the velocity of moving image content changes, the difference in velocity can be accommodated.

In a case where a plurality of visual points exist, weights are assigned to the visual points, and the degree of similarity is multiplied by each of the weights.

For example, for a visual point created by a user, a higher weight is assigned to a scene.

When dynamic programming (Smith-Warterman) is used to calculate the degree of similarity, the smaller the value, the higher the degree of similarity. Thus, the degree of similarity is divided by a corresponding weight.

For example, for determined moving images n,
when the visual point is the front, the weight may be set to 2; and
when the visual point is the lateral, the weight may be set to 1.5.

An example in which the aforementioned weighting is applied to moving image content is described as follows:

| moving image | moving image number | degree of similarity | weighting |
|---|---|---|---|
| moving image content (front): | moving image 1 | =0 | → 0/2 = 0 |
| moving image content (front): | moving image 2 | =3 | → 3/2 = 1.5 |
| moving image content (lateral): | moving image 3 | =5 | → 5/1.5 = 3.33 |
| moving image content (front): | moving image 4 | =6 | → 6/2 = 3 |
| moving image content (front): | moving image 5 | =10 | → 10/2 = 5 |
| ... | | | |
| moving image content (top): | moving image n | =29 | → 29 = 29 |

The computer system determines, in ascending order of the value of the degree of similarity, some scenes as being candidates to be selected, the scenes including moving image content to which weights have been assigned.

The computer system selects at least one scene that includes moving image content to be retrieved on the basis of the calculated degrees of similarity. In addition to the degree of similarity, image matching algorithm may be optionally used to assign weights to moving images to be retrieved. Information used in weighting is added to moving images to be retrieved in advance. The information includes, for example, color information that shows the color features of moving image content or shape information that shows the shape features of moving image content, or backgrounds of moving image content.

The accuracy of matching can be improved using the features of moving image content. The accuracy may be improved using a common technique. The following method is an exemplary common technique.

In the method, when the computer system extracts moving image content, the computer system can also obtain additional information. The additional information includes number information that shows the number of models included in the moving image content and/or color information that shows the color features of the moving image content and/or shape information that shows the shape features of the moving image content. Additional information can be obtained for each piece of moving image content. For example, in the case of moving image content of a soccer ball, "1" can be obtained as number information, "white" and "black" can be obtained as color information, and "circle" can be obtained as shape information. Moreover, for example, in the case of moving image content of a wall formed by soccer players in front of a goal, "4" can be obtained as number information, "red", "green", "white", and "peach" can be obtained as color information, and "strip-shaped" can be obtained as shape information. Number information can be obtained by counting models included in moving image content. Color information and shape information can be obtained from the position of moving image content corresponding to a position that has the color information and shape information of a three-dimensional model. The computer system may correlate additional information to moving image content using a tree structure in relation to the moving image content. When such additional information is obtained together with moving image content, information that characterizes each model is increased, and thus the accuracy of matching can be improved. For example, in a frame in which models overlap with each other, a plurality of models that are in incomplete shapes and close to each other exist. However, since the color and the shape are unique to each model, the computer system can use the color information and shape information of each model for matching.

FIG. 6 shows an exemplary configuration of an overall system of an embodiment of the present invention.

A scene creation screen (605) is a screen on which a user creates a three-dimensional model and gives a motion to the three-dimensional model. On the scene creation screen (605), the main body of a three-dimensional model, the locus of the three-dimensional model, the velocity variation of the three-dimensional model, and addition information for the three-dimensional model may be created. In this creation process, data prepared in a prior knowledge database (607) in advance may be selected and used. The prior knowledge database (607) may also serve as a model database. The prior knowledge database (607) is a database in which information that can be used when a three-dimensional model is created, the visual point of the three-dimensional model is determined, and moving images to be retrieved are determined is stored. The information includes, for example, information on the main body of a three-dimensional model, the locus of the three-dimensional model, the velocity variation of the three-dimensional model, addition information for the three-dimensional model, motion vectors, and moving image content. The prior knowledge database (607) may be included in a storage unit (604). The storage unit (604) stores the main body of the three-dimensional model, the locus of the three-dimensional model, the velocity variation of the three-dimensional model, and the addition information for the three-dimensional model created on the scene creation screen (605). A visual point determining unit (602) is included in a calculation unit (601). The visual point determining unit (602) allows a user to determine a visual point. The visual point determining unit (602) creates candidate visual points for a user to determine a visual point, using data stored in the storage unit (604) and the prior knowledge database (607). The visual point determining unit (602) creates candidate visual points using moving images that include moving image content with a high velocity or a high acceleration. The moving images are stored in a moving image data database (608). The moving image data database (608) is a database in which moving images to be retrieved are stored. A moving image site (606) displays moving images stored in the moving image data database (608). The moving image site (606) includes functions of tag search and AND search or OR search for narrowing down moving images. A mapping unit (609) is included in the calculation unit (601). The mapping unit (609) obtains, from the moving image data database (608), moving images to be retrieved and obtains information on a motion from the moving images. The calculation unit (601) obtains a motion vector that is a first vector, using the visual point determined by the visual point determining unit (602) and data stored in the storage unit (604) and the prior knowledge database (607). The calculation unit (601) obtains a motion vector that is a second vector, using the information on a motion obtained by the mapping unit (609) and data stored in the storage unit (604) and the prior knowledge database (607). The calculation unit (601) obtains the degree of similarity using the first and second vectors. The calculation unit (601) assigns weights to the degree of similarity. The weighting is performed using the visual point determined by the visual point determining unit (602) and the moving images to be retrieved obtained from the moving image data database (608). The calculation unit (601) obtains sets of moving images that are candidates to be selected, using the degree of similarity. The calculation unit (601) stores reusable information such as the first and second vectors and the degree of similarity in the storage unit (604) or the prior knowledge database (607). A selection unit (603) is included in the calculation unit (601). The selection unit (603) allows the user to determines a set of moving images from the sets of moving images, which are candidates to be selected, obtained in the calculation unit (601). The determined moving images are displayed on the moving image site (606).

Figure 7:
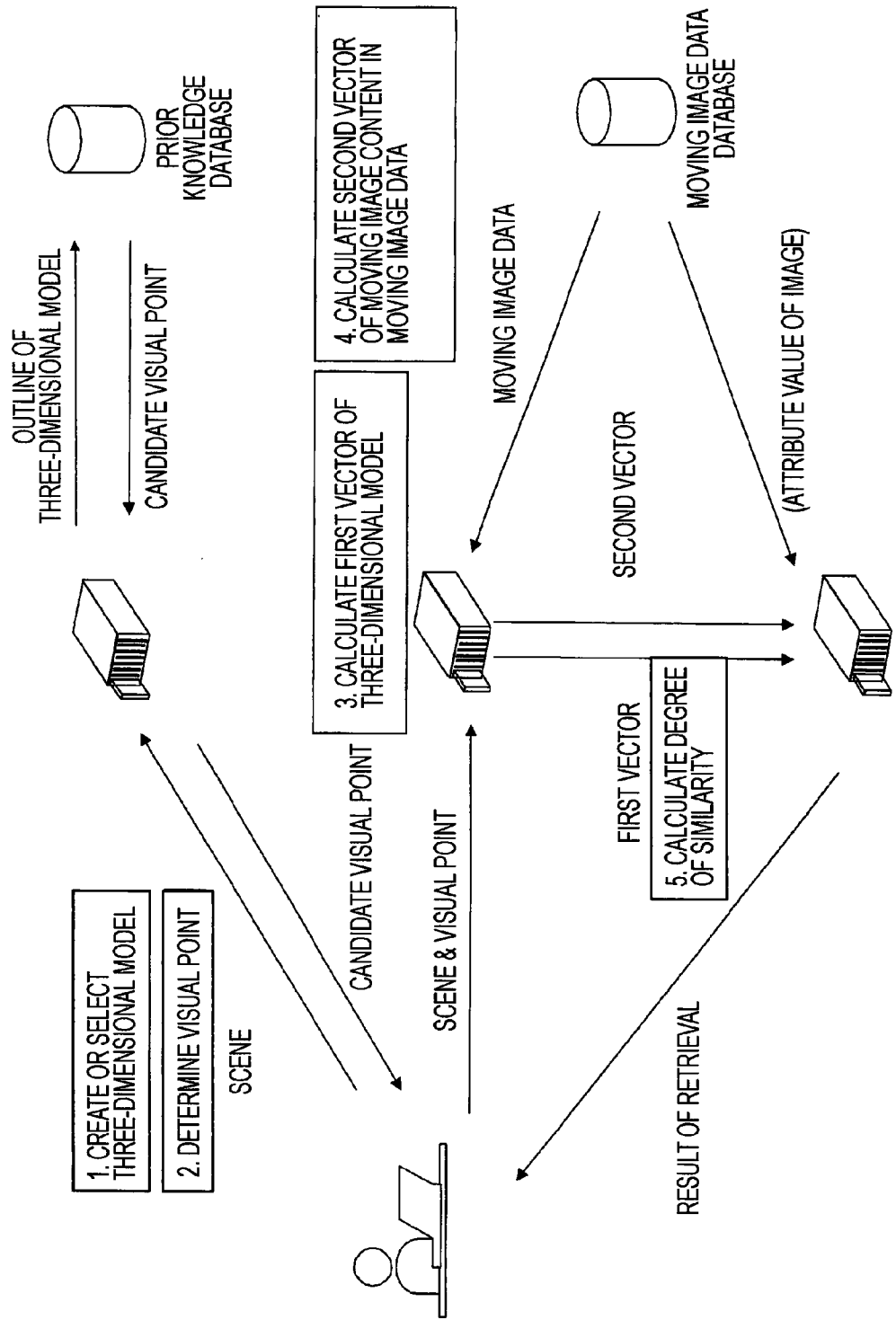
FIG. 7 shows the flow of a process in the overall system of the embodiment of the present invention.

FIG. 7 shows the flow of a process in the overall system of the embodiment of the present invention.

Creation or Selection of Three-Dimensional Model

A user creates a three-dimensional model. Alternatively, the user may select an existing three-dimensional model. The user creates a scene that needs to be retrieved using the three-dimensional model.

Determination of Visual Point

The user determines a visual point by moving the created scene. Moreover, the system can obtain candidate visual points by searching the prior knowledge database using the outline of the three-dimensional model. The candidate visual points are used when the user determines a visual point.

Calculation of First Vector of Three-Dimensional Model

The system obtains a first vector using the scene created and the visual point determined by the user.

Calculation of Second Vector of Moving Image Content in Moving Image Data

The system obtains moving image data from the moving image data database. The system obtains a second vector of moving image content included in the moving image data.

Calculation of Degree of Similarity

The system obtains the degree of similarity using the first and second vectors. Attribute values of images that can be obtained from the moving image data database may be assigned to the degree of similarity as weights. The system shows the user sets of moving images with a high degree of similarity as the result of the retrieval.

In the embodiments of the present invention, the computer system typically includes a CPU and a main memory. The CPU and the main memory are connected to a bus. A display unit such as an LCD monitor is connected to the bus via a display controller. Moreover, various types of drives, for example, a hard disk, a silicon disk, a CD, a DVD, or a Blu-ray Disc (BD), are connected to the bus as storage units via an IDE controller, an SATA controller, or a USB controller.

What is claimed is:

1. A computer system that retrieves, from at least one piece of moving image data, at least one scene that includes moving image content to be retrieved, the computer system comprising:

a storage unit that stores: (a) a locus of a three-dimensional model of the moving image content to be retrieved, and (b) a velocity variation of the three-dimensional model, the three-dimensional model being a model in three spatial dimensions, the locus being a locus within the three spatial dimensions, the velocity variation being a velocity variation in the three spatial dimensions;

a first calculation unit that calculates a first vector regarding the three-dimensional model, the first vector including the locus of the three-dimensional model and the velocity variation of the three-dimensional model, wherein the first calculation unit calculates the first vector regarding the three-dimensional model as viewed from a selected visual point in the three spatial dimensions;

a second calculation unit that calculates a second vector regarding the moving image content to be retrieved included in the at least one piece of moving image data, the second vector being calculated on the basis of information on a motion of the moving image content;

a third calculation unit that calculates a degree of similarity between the first and second vectors by comparing the first and second vectors; and a selection unit that selects, from the at least one piece of moving image data, the at least one scene, which includes the moving image content to be retrieved, on the basis of the degree of similarity.

2. The computer system according to claim 1, further comprising a visual point determining unit that allows a user to determine the visual point in the three spatial dimensions.

3. The computer system according to claim 2, wherein, when prior knowledge about a locus or velocity variation of the moving image content to be retrieved included in the moving image data exists, the visual point determining unit further determines visual points that are close to the prior knowledge as being candidate visual points.

4. The computer system according to claim 2, wherein the visual point determining unit further selects visual points at which velocity or acceleration obtained from the first vector is large in descending order of the velocity or the acceleration.

5. The computer system according to claim 1, further comprising a mapping unit that obtains, regarding moving images that include the moving image content to be retrieved, information on a motion of the moving image content.

6. The computer system according to claim 1, wherein the third calculation unit, which calculates a degree of similarity, includes means for calculating a degree of similarity between frames of moving images of the model and frames of moving images that include the moving image content to be retrieved included in the moving image data.

7. The computer system according to claim 1, wherein the third calculation unit, which calculates a degree of similarity, includes means for accommodating difference in velocity by dividing, into a constant number of frames, frames of moving images of the model or frames of moving images that include the moving image content to be retrieved included in the moving image data.

8. The computer system according to claim 2, wherein the third calculation unit, which calculates a degree of similarity, includes means for calculating a degree of similarity according to a weight assigned to each visual point.

9. The computer system according to claim 1, wherein each piece of moving image data that includes the moving image content to be retrieved includes a tag, further comprising:

search means for searching for tags to narrow down moving images that include the moving image content.

10. The computer system according to claim 1, wherein the third calculation unit, which calculates a degree of similarity, compares the first and second vectors, compares a velocity vector obtained from the first vector and a velocity vector obtained from the second vector, and calculates a degree of similarity from the respective results of the comparison.

11. A method for retrieving, from at least one piece of moving image data, at least one scene that includes moving image content to be retrieved, the method comprising:

a step of storing: (a) a locus of a three-dimensional model of the moving image content to be retrieved, and (b) a velocity variation of the three-dimensional model, the three-dimensional model being a model in three spatial dimensions, the locus being a locus within the three spatial dimensions, the velocity variation being a velocity variation in the three spatial dimensions;

a step of calculating a first vector regarding the three-dimensional model, the first vector including the locus of the three-dimensional model and the velocity variation of the three-dimensional model, wherein the first calculation unit calculates the first vector regarding the three-dimensional model as viewed from a selected visual point in the three spatial dimensions;

a step of calculating a second vector regarding the moving image content to be retrieved included in the at least one piece of moving image data, the second vector being calculated on the basis of information on a motion of the moving image content;

a step of calculating a degree of similarity between the first and second vectors by comparing the first and second vectors; and a step of selecting, from the at least one piece of moving image data, the at least one scene, which includes the moving image content to be retrieved, on the basis of the degree of similarity.

12. The method according to claim 11, further comprising a step of allowing a user to determine a visual point in the three spatial dimensions.

13. The method according to claim 12, wherein the step of allowing determination of a visual point includes a step of determining, when prior knowledge about a locus or velocity variation of the moving image content to be retrieved included in the moving image data exists, visual points that are close to the prior knowledge as being candidate visual points.

14. The method according to claim 12, wherein the step of allowing determination of a visual point includes a step of selecting visual points at which velocity or acceleration obtained from the first vector is large in descending order of the velocity or the acceleration.

15. The method according to claim 11, further comprising a step of obtaining, regarding moving images that include the moving image content to be retrieved, information on a motion of the moving image content.

16. The method according to claim 11, wherein the step of calculating a degree of similarity includes a step of calculating a degree of similarity between frames of moving images of the model and frames of moving images that include the moving image content to be retrieved included in the moving image data.

17. The method according to claim 11, wherein the step of calculating a degree of similarity includes a step of accommodating difference in velocity by dividing, into a constant number of frames, frames of moving images of the model or frames of moving images that include the moving image content to be retrieved included in the moving image data.

18. The method according to claim 12, wherein the step of calculating a degree of similarity includes a step of calculating a degree of similarity according to a weight assigned to each visual point.

19. The method according to claim 11, wherein each piece of moving image data that includes the moving image content to be retrieved includes a tag, further comprising:

a step of searching for tags to narrow down moving images that include the moving image content to be retrieved.

20. A method for retrieving, from at least one piece of moving image data, at least one scene that includes moving image content to be retrieved, the method comprising:

a step of storing a locus of a three-dimensional model of the moving image content to be retrieved and velocity variation of the three-dimensional model;

a step of storing: (a) a locus of a three-dimensional model of the moving image content to be retrieved, and (b) a velocity variation of the three-dimensional model, the three-dimensional model being a model in three spatial dimensions, the locus being a locus within the three spatial dimensions, the velocity variation being a velocity variation in the three spatial dimensions;

a step of allowing a user to determine a visual point in the three spatial dimensions;

a step of calculating, regarding the three-dimensional model, a first vector as viewed from the determined visual point in the three spatial dimensions, the first vector including the locus of the three-dimensional model and the velocity variation of the three-dimensional model;

a step of calculating a second vector regarding the moving image content to be retrieved included in the at least one piece of moving image data, the second vector being calculated on the basis of information on a motion of the moving image content;

a step of calculating a degree of similarity between the first and second vectors by comparing the first and second vectors; and a step of selecting, from the at least one piece of moving image data, the at least one scene, which includes the moving image content to be retrieved, on the basis of the degree of similarity.

21. A computer program residing on a tangible computer media for retrieving, from at least one piece of moving image data, at least one scene that includes moving image content to be retrieved, the computer program causing a computer system to execute the method steps of claim 11.

* * * * *